United States Patent [19]

Shannon

[11] 3,918,070

[45] Nov. 4, 1975

[54] SEMICONDUCTOR DEVICES

[75] Inventor: John Martin Shannon, Salfords, England

[73] Assignee: U.S. Philips Corporation, New York, N.Y.

[22] Filed: Nov. 27, 1973

[21] Appl. No.: 419,435

[30] Foreign Application Priority Data

Dec. 1, 1972 United Kingdom ............... 55563/72

[52] U.S. Cl. .............. 357/24; 307/221 D; 307/304; 340/173 R; 357/17; 357/30; 357/41

[51] Int. Cl.[2] .................... H01L 27/04; H01L 29/78

[58] Field of Search .... 307/221 D, 304; 317/235 G; 357/24; 340/173 R

[56] References Cited

UNITED STATES PATENTS

| | | | |
|---|---|---|---|
| 3,453,507 | 7/1969 | Archer | 317/235 G |
| 3,623,132 | 11/1971 | Green | 357/24 |
| 3,676,715 | 7/1972 | Brojdo | 357/24 |
| 3,721,839 | 3/1973 | Shannon | 317/235 G |
| 3,781,574 | 12/1973 | White et al. | 317/235 R |
| 3,792,322 | 2/1974 | Boyle et al. | 307/304 |
| 3,795,847 | 3/1974 | Engeler et al. | 357/24 |
| 3,806,772 | 4/1974 | Early | 307/304 X |

FOREIGN PATENTS OR APPLICATIONS

| | | | |
|---|---|---|---|
| 7,203,662 | 9/1972 | Netherlands | 357/41 |

*Primary Examiner*—William D. Larkins

*Attorney, Agent, or Firm*—Frank R. Trifari; Jack Oisher

[57] ABSTRACT

A semiconductor device comprising a charge transfer device having a plurality of storage sites and a plurality of field effect transistors for reading the charge condition at a plurality of said sites. This is accomplished by locating the channels of the field effect transistors below the storage sites to be read and controlling or affecting the size of the channels by the amount of charge stored at the associated sites. Measuring the current through the channel thus indicates the charge level.

16 Claims, 17 Drawing Figures

SEMICONDUCTOR DEVICES

This invention relates to semiconductor devices comprising a semiconductor body, a plurality of spaced conductive layers extending over and insulated from a surface layer of the semiconductor body, said conductive layers forming with underlying regions of the surface layer a plurality of succeeding capacitive charge storage means whereby on application of appropriate potentials to the conductive layer charge can be transferred sequentially in a preferred direction via the storage means.

Such devices are known in the form of so-called "charge coupled devices" and MIS transistor "bucket brigade devices" and will be referred to herein as charge storage and transfer devices (CTD). They may be employed in various applications, for example in imaging applications and in solid state memories. In the known devices charge information which is introduced into a particular storage means, for example by means of an electrical input providing a quantity of charge which is subsequently transferred to the particular storage means or by means of charge carriers generated by absorption of radiation in the semiconductor layer in the vicinity of the storage means, is subsequently read-out at an output stage after transfer via these other storage means present between the particular storage means and the output stage. Thus the read-out is sequential. This for certain applications is disadvantageous, for example in memories where it would be desired to read the charge pattern on the storage means in a random manner. Furthermore the output stage has to sense a relatively small quantity of charge and thus problems arise when it is desired to achieve charge amplification at the output. This invention is based on the recognition that by integrally combining an array of charge storage and transfer means with an array of field effect transistor structures various advantageous devices may be constructed, for example imaging devices, display devices, or solid state memory devices.

According to the invention a semiconductor device comprises a semiconductor body, a plurality of spaced conductive layers extending over and insulated from a surface layer of the semiconductor body, said conductive layers forming with underlying regions of the surface layer and the intervening insulating material a plurality of succeeding capacitive charge storage means whereby on application of appropriate potentials to the conductive layers charge can be transferred sequentially in a preferred direction via said storage means a plurality of said charge storage means serve for the modulation of the conductivity of underlying regions in the semiconductor body comprising channel regions of a plurality of field effect transistor structures, source and drain connections to the semiconductor body being present whereby an instantaneous output indicative of the charge stored in the storage means associated with one or more of said field effect transistor structures can be obtained by applying an appropriate potential between the source and drain connections associated with said one or more transistor structures.

In this device various advantages arise, the particular advantages being relevant to particular device structures. However it can be stated that an underlying principle of operation of a device in accordance with the invention whereby an advantageous difference occurs compared with the use of a known charge storage and transfer device is that in said conventional device used, for example, in imaging or other purposes, the parameter which is directly read-out is the amount of charge stored by the storage means associated with a particular conductive layer, said read-out being a destructive form of read-out and having to be carried out in a sequential manner by clocking the charge information to the charge storage and transfer device output means, whereas in a device in accordance with the invention the parameter on which the output is determined is the conductivity of the portion of the semiconductor body underlying the respective depletion region envelope at a certain position in the charge storage and transfer array and comprising a channel region of a field effect transistor structure. Thus the read-out is non-destructive and compared with the operation of the known structures has the very significant advantage of being carried out in such manner of obtaining output gain.

In one form such a device may be constructed as an imaging device having appreciable gain, for example as a device capable of yielding separate electrical output signals at each of said first electrode connections, as an image intensifier device, or as an imaging semiconductor active cold cathode device.

In another form such a device may be constructed as a solid state display device in which electrical input signals representative of an image are converted into a visible display.

In a further form such a device may be constructed as a solid state memory device which may be a dynamic random access memory.

Embodiments of the invention will now be described, by way of example, with reference to the accompanying diagrammatic drawings, in which.

Figures 8, 13:
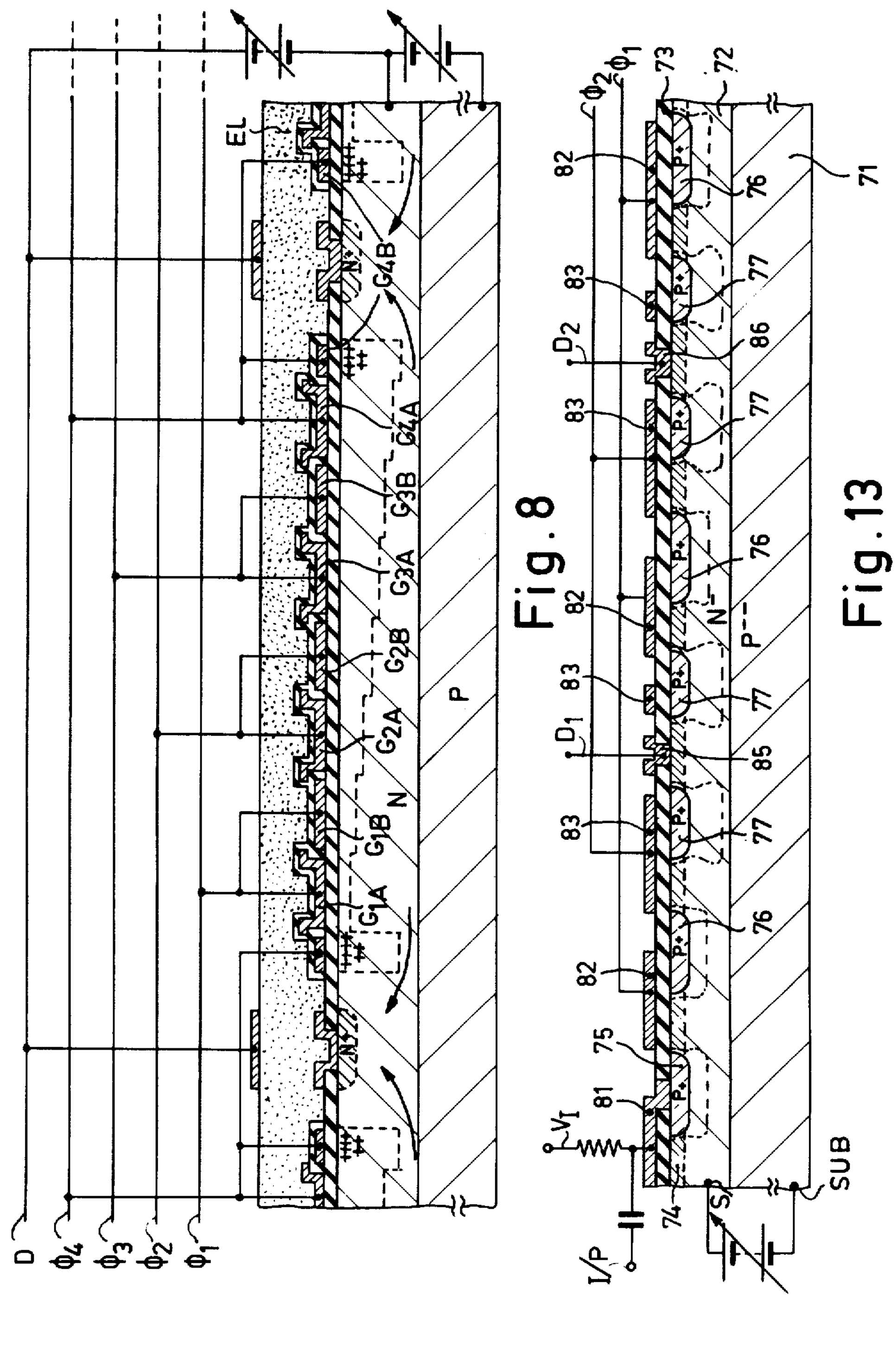
FIG. 8 shows part of another embodiment corresponding substantially in structure to the device shown in FIG. 6.
Figure 10:
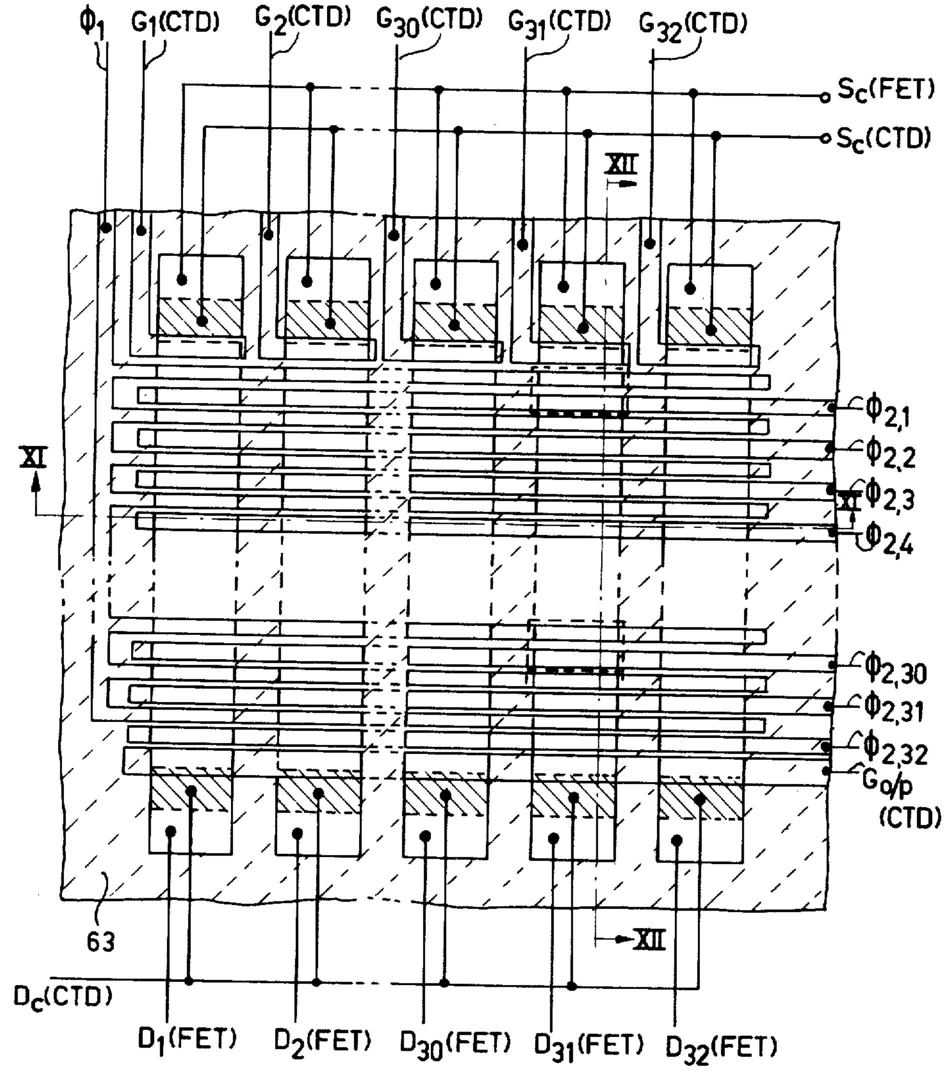
FIG. 10 is a diagrammatic plan view of a further embodiment of a device in accordance with the invention and consisting of a dynamic random access memory device.
Figures 12A, 12B, 12C:
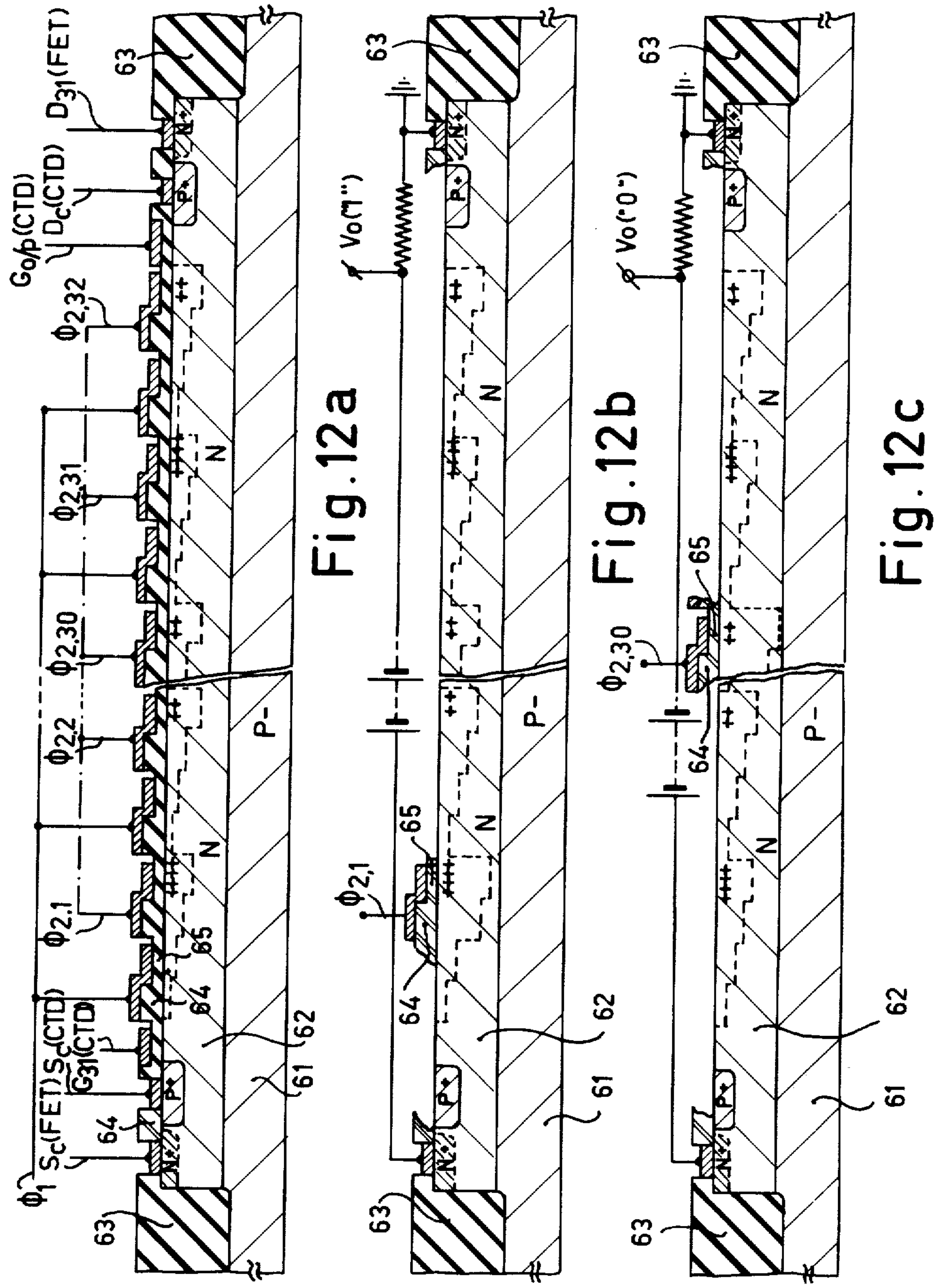

FIGS. 12*a*, *b* and *c* are diagrammatic cross-sectional views along the line XII-XII in FIG. 10 and serving to illustrate the operation of the memory device during various stages, and FIG. 13 is a cross-sectional view of part of a further device in accordance with the invention, the charge storage and transfer means being in the form of a so-called bucket brigade array.

Figure 1:
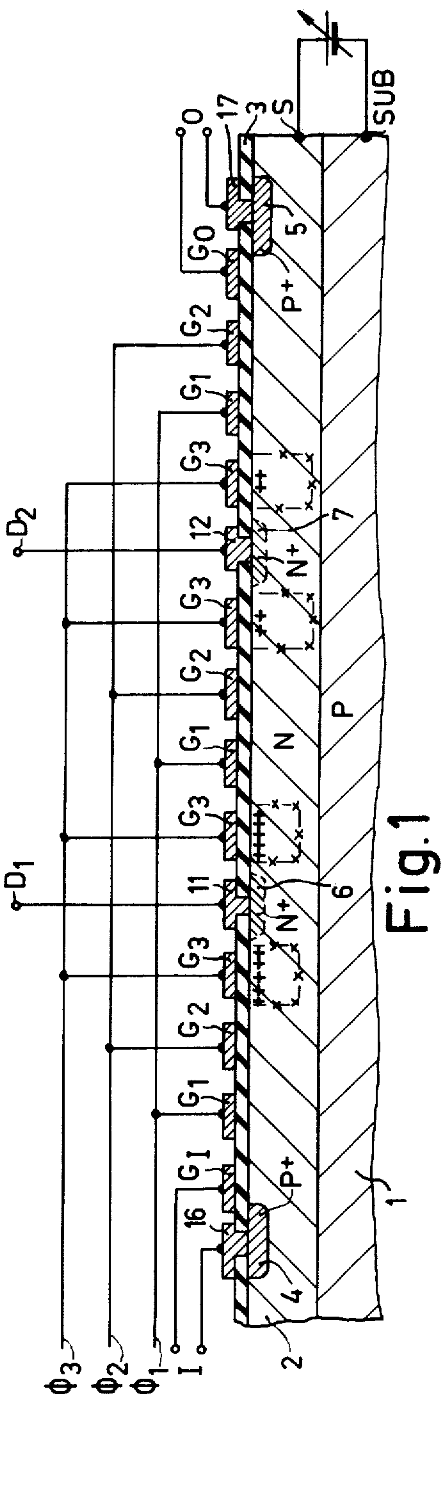
FIG. 1 is a cross-sectional view of a device in accordance with the invention and serving to illustrate some principles underlying the inventive concept.

Referring now to FIG. 1 some underlying principles embodied in a device in accordance with the invention will now be described. The device shown comprises a p-type silicon substrate 1 having a surface n-type epitaxial layer 2 of silicon thereon. On the surface of the epitaxial layer 2 there is an insulating layer 3 of silicon oxide. On the surface of the insulating layer 3 there is a charge transfer device structure comprising a plurality of spaced conductive electrodes $G_1$, $G_2$, $G_3$ arranged in groups. In each group $G_1$ and $G_2$ are in the form of strips and $G_3$ is of an annular configuration. The electrodes $G_1$, $G_2$ and $G_3$, referred to hereinafter as gate electrodes, in the various groups are respectively connected to common lines $\phi_1\phi_{02}$ and $\phi_3$. At opposite ends of the device further insulated electrodes $G_I$ and $G_O$ are present, these respectively forming an input gate electrode and an output gate electrode of the charge transfer device structure. Associated with the input and output gate electodes there are p-type surface regions 4 and 5 respectively for the supply and removal of charge to and from the plurality of charge storage means constituted by the insulated gates $G_1$, $G_s$, $G_3$, the underlying regions of the n-type semiconductor layer 2 and the intervening portions of the insulating layer 3.

At the surface of the n-type layer 2 there are two $n^+$-regions 6 and 7, each of which is of substantially circular outline and lies bounded by an insulated gate electrode $G_3$. Metal layers 11 and 12 form ohmic electrode connections to the $n^+$-regions 6 and 7 at the openings in the insulating layer 3. Further metal layers 16 and 17 form ohmic contact with the p-type regions 4 and 5 respectively. A connection indicated diagrammatically by reference S is made to the n-type layer and a connection indicated diagrammatically by reference Sub. is made to the p-type substrate 1.

The regions 6 and 7 together with their ohmic connections 11 an 12 constitute the drain electrodes and connections thereto of deep depletion field effect transistor structures, the source electrode connections of said transistor structures being constituted by the common connection S to the n-type layer 2. In each of the transistor structures the gate electrode is constituted by the gate electrode $G_3$ adjoining and surrounding the drain. Thus in the transistor structure comprising the drain 6, 11, the gate electrode is the annular gate $G_3$ surrounding the drain 6, 11 and in the transistor structure comprising the drain 7, 12, the gate electrode is the annular gate $G_3$ surrounding the drain 7, 12.

In the operation of the device the depletion region envelope associated with a particular gate electrode $G_3$, the extent of which for a certain fixed potential applied to said gate $G_3$ is determined by the amount of charge that has been introduced and stored therein, is used to modulate the conductivity of an underlying portion in the layer 2 which comprises a channel region of an FET structure associated with the particular gate electrode $G_3$. Thus in the device shown in FIG. 1 in the depletion region envelope associated with the first gate $G_3$ which surrounds the $n^+$-drain 6 connected to the line $D_1$ there is shown an amount of charge in the form of holes and represented as +++++ that has been introduced and stored at the surface therein. In the depletion region envelope associated with the second gate $G_3$ which surrounds the $n^+$-drain 7 connected to the line $D_2$, there is shown an amount of charge in the form of holes represented as ++ that has been introduced and stored at the surface therein. With the same potential appliced to both gates $G_3$ via the line $0_3$, assuming that the epitaxial layer 2 is substantially uniformly doped and the insulating layer 3 is uniform, then the depetion region envelope associated with the first gate $G_3$ extends to a lesser depth in the layer 2 than that associated with the second gate $G_3$ because a larger quantity of charge is stored in the depletion region envelope associated with said first gate electrode $G_3$ than is stored in the depletion region envelope associated with said second gate electrode $G_3$. Thus with this state of charge information present, in the FET structure comprising the $n^+$-drain 6, the surrounding gate electrode $G_3$ and the common source connection S, the channel current in the part of the layer 2 below the respective depletion region envelope will be a certain value dependant on the amount of charge represented as +++++ stored in said envelope. In the FET structure comprising the $n^+$-drain 7, the surrounding gate electrode $G_3$ and the common source connection S, the channel current in the part of the layer 2 below the respective depletion region envelope will be a higher value and dependant on the amount of charge represented ++ stored in said envelope.

In a practical embodiment of a device of the form shown in FIG. 1 there are a large plurality of the groups of electrodes $G_1$, $G_2$, $G_3$ and associated FET structures each with individual drains. Thus information in the form of a charge pattern introduced and stored in the depletion region envelopes can be read-out in a nondestructive maner at the various positions along the charge transfer device array either randomly, sequentially or simultaneously by applying suitable potentials between the FET drains $D_1$, $D_2$, etc. and the common source connection S.

It will be appreciated from the preceding description that an underlying principle of operation of a device in accordance with the invention whereby a difference occurs compared with the conventional CTD use is that in said conventional CTD use, for example in imaging or other purposes, the parameter which is directly read-out is the amount of charge stored in a depletion region envelope below a particular gate, said read-out being a destructive form of read-out and having to be carried out in a sequential manner by clocking the charge information to the CTD output means, whereas in a device in accordance with the invention the parameter on which the output is determined is the conductivity of the portion of the semiconductor body underlying the respective depletion region envelope at a ceertain position on the CTD array and comprising a channel region of an FET structure. Thus the read-out is normally non-destructive compared with conventional CTD action and it has the very significant advantage of being carried out in such manner of obtaining output gain, it being noted that in conventional CTD action the output involves the sensing of a very small amount of charge.

The device of the form shown in FIG. 1 may be constructed in various different ways according to a particular desired use and its operation may also be determined accordingly. The advantages inherent in the structure are utilised to full extent when the charge information stored at the surface of the depletion region envelopes is introduced therein by conventional CTD action. For example, information in the form of a charge pattern can be introduced by conventional CTD action which is representative of an optical image when the device is constructed for operation as a display device as will be described hereinafter, or digital information in the form of a charge pattern can be introduced by conventional CTD action when the device is constructed for operation as a solid state memory device as will be described hereinafter. However in certain applications it is possible to introduce at least part of the charge pattern by other means, for example by the absorption of incident radiation in the semiconductor body as also will be described hereinafter.

When the device is constructed for use in imaging or display applications various methods of operation may be carried out for resetting at the end of frame intervals. In one form of such operation of a device of the form shown in FIG. 1 the depletion regions associated with the gate electrodes $G_3$ initially are re-set so that they extend substantially entirely across the thickness of the epitaxial layer 2 whereby the parts of the layer 2 below the gate electrodes $G_3$ are fully depleted of mobile charge carriers and the channel regions of the deep depletion field effect transistor structures are thereby blocked. This initial setting is achieved by application of a large potential to the gates $G_3$ via the line $\phi_3$. A variable bias source is shown connected between the ohmic connections S and Sub and this may be used to provide a depletion region associated with the p-n junction between the substrate 1 and layer 2 in which case the re-setting potential applied to the gates $G_3$ need only be sufficient to cause the associated depletion regions to meet the deplation region associated with the layer/substrate p-n junction.

The potential applied to the gates $G_3$ for producing the depletion regions is maintained during the subsequent frame interval of operation. At the instant of resetting the depletion regions associated with the gates $G_3$ the field effect transistor (FET) channels are all blocked. When charge in the form of holes is thereafter introduced into the depletion regions, while still maintining the same signal on $\phi_3$, the depletion regions will retract thus opening up the FET channels below the depletion regions associated with the gates $G_3$. The magnitude of the channel currents in the FET's that flow when applying a potential between the common source connection S and the respective drain connections $D_1$ and $D_2$ is now representative of the amount of charge introduced into the respective depletion regions. Furthermore the read-out may be in the form of a series of pulses applied between the connection S aand the drain of the respective FET or alternatively may be in the form of a continuous D.C. bias between the connection S and the respective drain of the FET. The second case is of particular use in imaging applications because an integrated output signal can be obtained which is representative of the amount of charge introduced into the respective depletion region during a frame interval.

When the device is constructed for operation in the mode in which charge is introduced by absorption of incident radiation which occurs in the n-type semiconductor layer 2 within the depletion region or within a diffusion length of the depletion region and generates electron-hole pairs, it may form a solid state imaging device capable of yielding electrical signals at each of the FET drains indicative of the radiation incident on that part of the semiconductor layer adjacent and including the depletion region associated with the respective FET gate $G_3$. During the frame interval the effect of the absorbed incident radiation is integrated and an increasing output signal is achieved at the FET drains as the depletion regions retract and the FET channels open. At the end of each frame interval the accumulated stored charge in the form of holes has to be removed and this is achieved by a conventional three-phase charge transfer device (CTD) action wherein on application of suitable potentials to the lines $\phi_1$, $\phi_2$ and $\phi_3$ the charge stored under all the gate electrodes $G_3$ is progressively transferred to the output constituted by the output gate and the p-type region 5 having the ohmic connection 17. In this mode of operation the electrical input source of charge (holes) formed by the p-type region 4 and the input gate $G_I$ are not absolutely essential but but these are shown in FIG. 1 for the purposes of describing the other modes of operation of a device in accordance with the invention in which information in the form of a charge pattern is introduced by conventional CTD action, The imaging mode of operation of the device as just described may also be utilised to provide a record of the absorbed incident radiation during the frame interval because the accumulated stored charge below the gates $G_3$ is clocked out successively at the output terminal electrode 17 at the end of the frame interval. Resetting is then effected by applying the said large potential to the line $\phi_3$, said potential being maintained during the frame interval prior to the removal of the accumulated stored charge by the three-phase CTD action. During the frame interval prior to this removal of charge by the CTD action the potentials on the lines $\phi_1$ and $\phi_2$ are zero and at the end of the frame interval the charge removal by the three-phase CTD action is arranged so that there is no stored charge below the gates $G_1$ and $G_2$ at the commencement of the next frame interval when the said large potential is applied to the gates $G_3$ via the line $\phi_3$.

For the means of deriving signals sequentially from the FET drains such as $D_1$ and $D_2$ reference is directed to my Pat. No. 3721839. Furthermore in the above described imaging application of the device all the FET drains may be connected in common and the device constructed as a solid state image intensifier by providing current controlled display means, for example electroluminescent means, in series with each of the drain connections on the semiconductor layer. Alternatively the device may be constructed as an active semiconductor cold cathode by providing a semiconductor layer suitable for electron emission in series with the drain connections. In respect of the above described constructions of the device for such forms of imaging and the specific means by which the electroluminescent means and the electron emissive material are incorporated reference is invited to co-pending Applications Ser. Nos. 398,479, 398480 and 398491 all filed Sept. 18, 1973.

A mode of operation of the device shown in FIG. 1 in which information in the form of electrical input signals is converted into a charge pattern stored in depletion regions below the gates $G_3$ will now be described. The input signals, which may be video signals, are applied to the input gate $G_I$ adjacent the electrode connection 16 to the p-type region 4. This p-type region 4 forms a source of injected holes and the potential applied to the input gate $G_I$ monitors the hole introduction into a depletion region associated with the input gate $G_I$. By means of a conventional three-phase CTD action by applying appropriate potentials to the gates $G_1$, $G_2$ and $G_3$ via lines $\phi_1$, $\phi_2$ and $\phi_3$, the input signal is converted into a charge pattern below the gates $G_3$. This charge pattern consists of different amounts of charge in the form of holes in the different depletion regions associated with the gates $G_3$. Three different methods of applying the charge pattern will now be described. In the first method the clocking voltages applied to $\phi_1$, $\phi_2$ and $\phi_3$ are arranged such that for the condition of no charge below a gate electrode $G_3$, corresponding to a dark state in the video signal, the depletion layer associated with this gate $G_3$ just pinches-off the associated FET channel by just extending up to the p-n-junction between the substrate 1 and the layer 2. In the second method the clocking voltages on $\phi_1$, $\phi_2$ and $\phi_3$ are at smaller levels and following application of the charge pattern below the gates $G_3$ the potential on $\phi_3$ is raised by an amount sufficient to cause a depletion region associated with a gate $G_3$ having no stored charge (dark state) to just extend to the layer/substrate p-n junction. In the third method the clocking voltages on $\phi_1$, $\phi_2$ $\phi_3$ are again at smaller levels and following the application of the charge pattern below the gates $G_3$ the substrate/-layer junction is reverse biassed to cause the depletion region associated therewith to just extend to the level of a depletion region associated with a gate $G_3$ having no stored charge (dark state). Thereafter in the frame interval current is passed through the FET channels by applying pulses or a constant D.C. potential between the source connection S and drains of the FET structures. A display device may be constructed by suitable adaptation of the structure shown in FIG. 1 by providing electroluminescent material in series with the FET channels and thus a display is obtained which is representative of the input signal. At the end of a frame interval the charge pattern is removed by transfer thereof to the output by three-phase CTD action and a fresh charge pattern applied as previously described.

Figure 2:
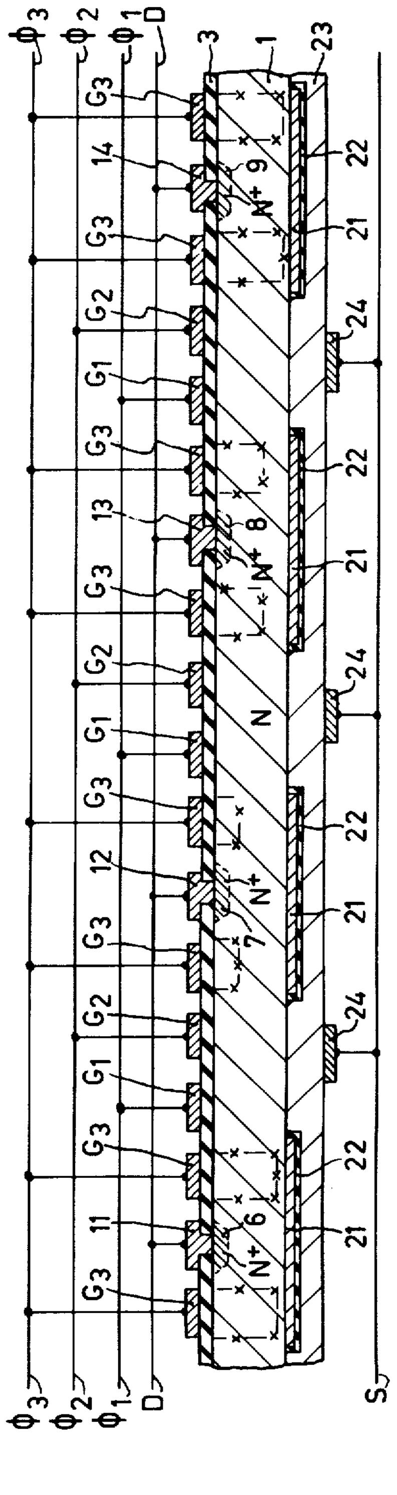
FIG. 2 is a cross-sectional view of part of a device in accordance with the invention in the form of a solid state display device comprising a three-phase charge storage and transfer arrangement.

A modification of a device structure as shown in FIG. 1 to provide a solid state display device in which the display is representative of an input video signal will now be described with reference to FIG. 2. In FIGS. 1 and 2 corresponding parts are indicated with the same reference numerals and letters. The input and output means in the device shown in FIG. 2 are similar to those shown in FIG. 1 but are omitted for the sake of clarity. Furthermore in FIG. 2 four FET sturctures are shown, these FET structures comprising drain electrode regions 6, 7, 8 and 9 and drain electrodes 11, 12, 13 and 14. In this device an electrode pattern having portions 21 situated opposite the FET gates and drains is present on the lower surface of the n-type semiconductor layer 1. The electrode portions 21 are of a metal which froms a Schottky junction with the n-type layer and a common connection (not shown) is made to the electrode portions 21 whereby Schottky junction may be reverse biased or the metal layer portions 21 may be externally connected to the n-type layer 1. The surfaces of the metal layer portions 21 remote from the layer 1 are provided with an insulating coating 22. On the lower surface of the n-type layer 1 and covering the metal layer portions 21 having the insulating coating 22 thereon there is a layer 23 of electroluminescent material.

On the lower surface of the electroluminescent layer 23 there are a plurality of electrodes 24 which are interconnected. The drain electrodes 11, 12, 13, 14 of the FET structures are all interconnected by the common line which is indicated by reference D. In this device the Schottky junction forming electrode portions 21 may be considered as the electrical equivalent of the p-type substrate in FIG. 1 as these are used in the control of the extent of the depletion regions associated with the gates $G_3$ when the setting voltage is applied to the line $\phi_3$. The electroluminescent layer 23 forms a plurality of common source connections of the FET structures. Thus when the channel of an FET structure is unblocked current can pass between the electrodes 24 and the respective FET drain via the channel portion below the depletion region associated with the respective annular gate $G_3$ and also via the electroluminescent layer 23. Thus an electroluminescent output display may be obtained which is indicative of the charge pattern applied below the FET gates $G_3$.

In a modification of the embodiment shown in FIG. 2 the electroluminescent layer 23 is applied such that it has a high transverse conductance and a low lateral conductance, the source and drain connections of the FET structures both being formed by the contact of the electroluminescent layer with the lower surface of the n-type layer 2. In this device the drain connections at the upper surface as shown in FIG. 2 are not present and the electrode pattern on the lower surface of the electroluminescent layer consists of an interdigitated structure of two electrodes in series with the source and drain connections of the FET structures provided by the contact of the electroluminescent layer with the n-type layer. Also isolation means may be present to at least partially isolate the individual FET structures and these may consist of sunken oxide layer portions in the n-type layer 2.

Figure 3:
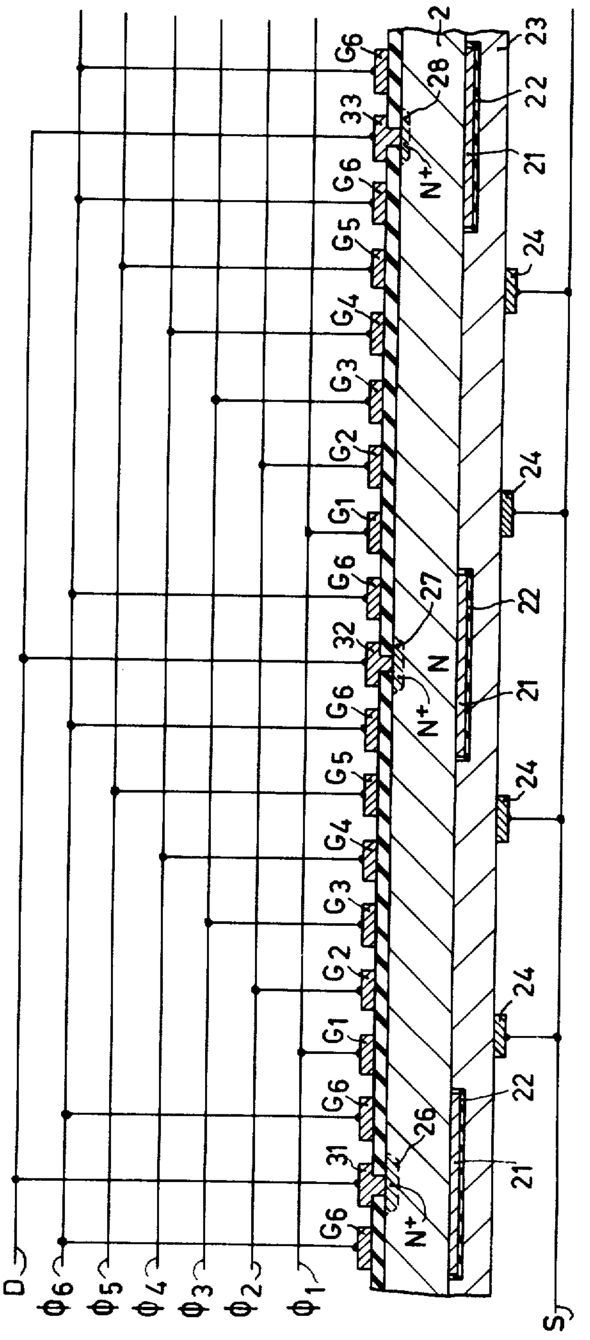
FIG. 3 is a cross-section of a device in accordance with the invention in the form of a solid state display device comprising a modified form of three-phase charge storage and transfer arrangement.

Referring now to FIG. 3, the device shown is similar to that shown in FIG. 2, corresponding parts being indicated by the same reference numerals and characters, the main difference residing in that this device is constructed with two CTD bits per FET element in order to permit resetting between frame intervals in such a form that variations in the semiconductor layer 2, for example variations in thickness and doping, are compensated. The charge storage and transfer means comprise groups of six gate electrodes $G_1$ to $G_6$ and connected to the lines $\phi_1$ to $\phi_6$. The gates $G_1$ to $G_5$ are in the form of strips and the gates $G_6$ are of annular configuration. Three FET structures are shown in FIG. 3, the FET drains consisting of $n^+$-surface regions 26, 27 and 28 and ohmic electrodes 31, 32 and 33 respectively connected thereto. The annular gates $G_6$ form the FET gates. Input and output means are present (not shown) substantially of the form shown in FIG. 1.

In the operation of this device the gates $G_4$, $G_5$ and $G_6$are essentially used for the resetting, one group of gates $G_1$, $G_2$ and $G_3$ together with the associated storage means forming one three-phase CTD bit and one group of gates $G_4$, $G_5$ and $G_6$ together with the associated storage means forming another three-phase CTD bit. Thus in this device an FET structure is present at alternate CTD bits.

The rate of introducing the signal information is half the rate of clocking and during this part of the cycle $\phi_1$ is made common with $\phi_4$, $\phi_2$ is made common with $\phi_5$, and $\phi_3$ is made common with $\phi_6$. The charge pattern indicative of the signal input is now stored in the depletion regions associated with the gates $G_3$. $\phi_1$, $\phi_2$ and $\phi_3$ are now disconnected from $\phi_4$, $\phi_5$ and $\phi_6$ respectively. A sufficiently large potential is then applied to the line $\phi_6$ to cause the depletion layers associated with the gates $G_6$ to punch-through to the underlying Schottky junctions. Thereafter by adjusting the potentials on $\phi_4$ and $\phi_5$ the information in the form of charge initially stored below the gates $G_3$ is transferred to below the gates $G_6$ where the n-type semiconductor layer has been fully depleted due to the depletion regions associated with the gates $G_6$ extending across the layer to the Schottky junctions. Thus a certain amount of charge initially stored below a gate $G_3$ on transfer to the depletion region below a gate $G_6$ will cause this depletion region to retract and the FET channel to be opened by an amount proportional to the amount of charge initially stored below the said gate $G_3$. If after read-in of the charge information no charge is intially present below a certain gate $G_3$, corresponding to the dark state, then the depletion region associated with the following gate $G_6$ will remain fully pinching-off the respective FET channel after the said adjustment of the potentials on $\phi_4$ and $\phi_5$. As the charge pattern is present below the gates $G_6$ and electroluminescent display may be obtained by application of a suitable potential difference between the lines S and D. At the end of the frame interval $\phi_1$, $\phi_2$ and $\phi_3$ are again made common with $\phi_4$, $\phi_5$ $\phi_6$ respectively, the previously introduced charge pattern is fed-out via the output means and a further charge pattern is introduced via the input means and fed to below the gates $G_3$.

Figure 4:
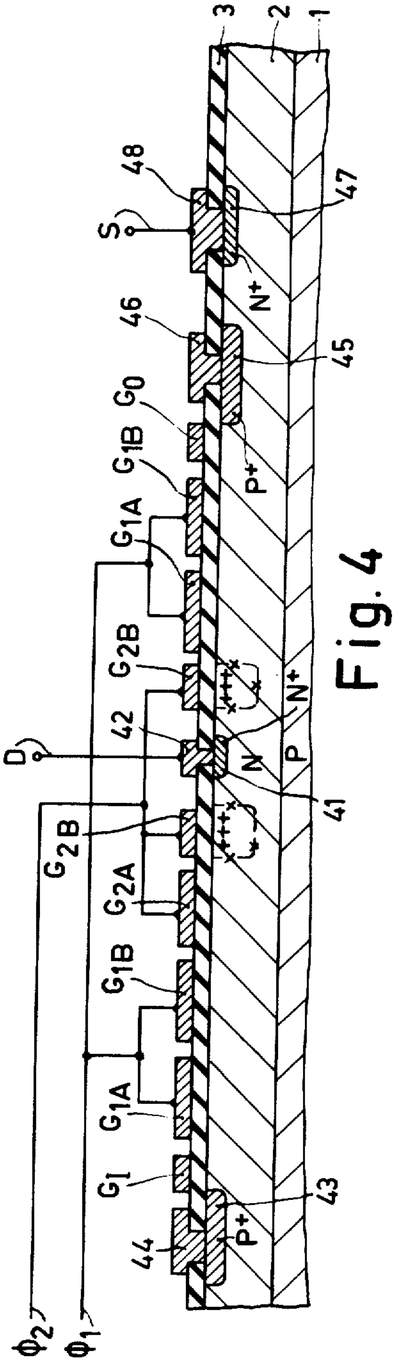
FIGS. 4 and 5 are a cross-section and plan vew respectively of a further structure and serving to illustrate the application of a two-phase charge storage and transfer arrangement in a device in accordance with the invention.
Figure 5:
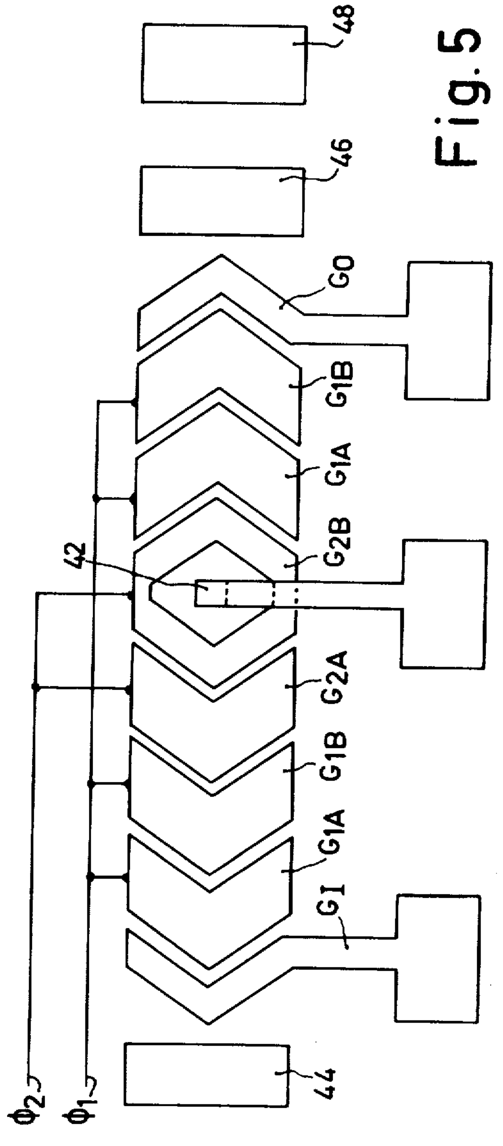

The provision of a two-phase charge storage and transfer arrangement in a device in accordance with the invention will now be described with reference to FIG. 4 and 5 which show in cross-section and plan view respectively a structure with which the operation of a device in accordance with the invention may be demonstrated. This structure comprises only a single FET element but in a practical embodiment a plurality of the FET elements and associated charge storage and transfer elements are present. The device comprises a p-type silicon substrate 1 having an n-type epitaxial layer 2 thereon. On the surface of the epitaxial layer 2 there is a silicon oxide layer 3. Although the layer 3 is shown having a uniform thickness, in practice it has a varying thickness as will be described hereinafter. A plurality of gate electrodes are present on the insultating layer. There are arranged in pairs $G_{1A}$, $G_{1B}$ and $G_{1A}$, $G_{2B}$, the two gates in the pairs comprising $G_{1A}$ and $G_{1B}$ being connected to the common line $\phi_1$ and the two gates in the single pair $G_{2A}$, $G_{2B}$ being connected to the common line $\phi_2$. The insulating layer thickness is greater under the gate $G_{1A}$ than under the gate $G_{1B}$ and therefore the MOS threshold voltage for gate $G_{1A}$ is higher than the MOS threshold voltage for gate $G_{1B}$. This means that when the same potential is applied to the gates $G_{1A}$ and $G_{1B}$ via the line $\phi_1$ the depletion region below gate $G_{1B}$ extends deeper into the layer than does the depletion region below gate $G_{1A}$. Similarly the insulating layer thickness is greater below the gate $G_{2A}$ than below the gate $G_{2B}$ and therefore the MOS threshold voltage for gate $G_{2A}$, which corresponds to the MOS threshold voltage for gate $G_{1A}$, is greater than the MOS threshold voltage for gate $G_{2A}$, which corresponds to the MOS threshold voltage for gate $G_{1B}$. At the input end of the device an input gate $G_I$ is present and a $p^+$-type surface region 43 having an electrode 44. As shown in FIG. 5 the gate $G_{2B}$ is of a closed structure and surrounds the FET drain which is constituted by an $n^+$-diffused surface region 41 having a drain electrode 42 in contact with the diffused surface region. At the output end of the device an output gate $G_0$ is present and a $p^+$-type surface region 45 having an electrode 46. A further $n^+$-region 47 is present and has an electrode 48, the region 47 and electrode 48 constituting the FET source. An ohmic connection is also present to the p-type substrate 1. The drain electrode 42 where it crosses the gate $G_{2B}$ is insulated from the gate by an intermediate deposited insulating layer. Operation of this device is effected in a similar manner to that described for the device shown in FIG. 1 with the exception that the charge transfer is effected by a conventional two-phase CTD action applying clock voltages to the lines $\phi_1$ and $\phi_2$. When a single FET is present as shown in FIG. 4 then for use of such a structure in a display device with an electrical input signal the possibility exists of resetting by punch-through operation. However in the practical embodiment where a plurality of FET structures are present and only one charge transfer device bit is present for each FET element this resetting mode is not readily possible in such a display device but may be employed when such a device structure is employed in an imaging device in which the stored charge in the depletion regions below the gates $G_{2B}$ is introduced therein due to absorption of incident radiation.

Figures 6A, 6B, 6C:
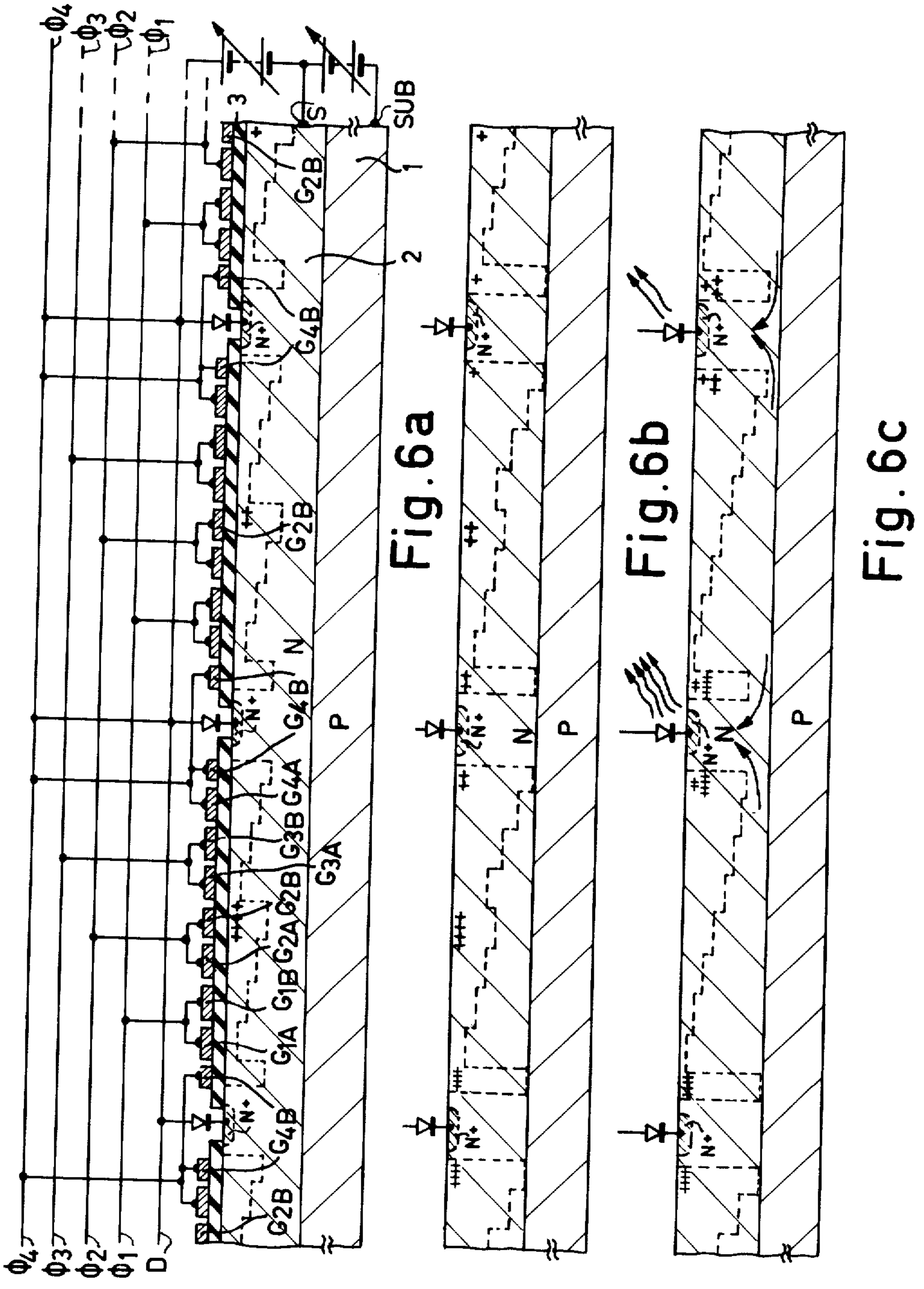
FIG. 6 shows in three cross-sections *a*, *b* and *c* part of a further device in accordance with the invention in the form of a display device and during various stages in the operation thereof.

Referring now to FIG. 6*a*, 6*b* and 6*c* a further embodiment of a device in accordance with the invention will now be described, this embodiment employing a two-phase CTD action and comprising two CTD bits per FET element. The device is similar in structure to that shown in FIGS. 4 and 5 in respect of the gate electrodes of the CTD bits. The device structure comprises a p-type silicon substrate 1 having an n-type epitaxial layer 2 thereon. On the surface of the epitaxial layer 2 there is a silicon oxide layer 3 of varying thickness and similar in configuration to that in the embodiment described with reference to FIGS. 4 and 5. As in said previous embodiment pairs of metal gate electrodes $G_{1A}$, $G_{1B}$ and $G_{2A}$, $G_{2B}$ are present, the two gates in the pairs comprising $G_{1A}$ and $G_{1B}$ being connected to the common line $\phi_1$ and the two gates in the pairs comprising $G_{2A}$ and $G_{2B}$ being connected to the common line $\phi_2$. These gates are succeeded by further pairs of metal gate electrodes $G_{3A}$, $G_{3B}$ and $G_{4A}$, $G_{4B}$, the two gates in the pairs comprising $G_{3A}$ and $G_{3B}$ being connected to a common line $\phi_3$ and the two gates in the pairs comprising $G_{4A}$ and $G_{4B}$ being connected to the common line $\phi_4$. The insulating layer thickness is greater under gates $G_{1A}$, $G_{2A}$, $G_{3A}$ and $G_{4A}$ than under gates $G_{1B}$, $G_{2B}$ , $G_{3B}$ and $G_{4B}$ and hence the MOS threshold voltage is greater for the first mentioned gates than for the second mentioned gates. The gates $G_{4B}$ are of closed structure and surround $n^+$-FET drain regions. Input and output gates and diffused regions similar to those shown in FIGS. 4 and 5 are present and for the sake of clarity are not shown in FIG. 6*a*. The device comprises a large plurality of series of gate electrodes $G_{1A}$ to $G_{4B}$ each having an associated $n^+$-FET drain region surrounded by the respective annular gate electrode $G_{4B}$, three such $n^+$-drain regions being shown in FIG. 6*a*. The annular gate electrodes $G_{4B}$ constitute the gates of deep depletion FET structures, a common source connection S being provided on the layer 2. The gate electrode pairs $G_{1A}$, $G_{1B}$ and $G_{2A}$, $G_{2B}$ connected to the lines $\phi_1$ and $\phi_2$ form one set of two-phase CTD bits and the gate electrode pairs $G_{3A}$, $G_{3B}$ and $G_{4A}$, $G_{4B}$ form another set of two-phase CTD bits.

In the series with each FET drain there is diagrammatically shown an electroluminescent p-n junction diode, these diodes being connected to a common drain line D and a variable D.C. source being connected between the line D and the common source connection S. A further variable D.C. source is connected between the source connection S and a substrate connection SUB.

The operation of the device shown in FIG. 6*a* as an electroluminescent display device with electrical input signals will now be described with reference to FIGS. 6*b*, 6*c* and FIG. 7 which shows the waveform of the clock voltages applied to the lines $\phi_1$, $\phi_2$, $\phi_3$ and $\phi_4$ and the channel current $I_{DS}$ as a function of time for one particular FET element. In FIGS. 6*b* and 6*c* the surface insulating layer and the electrode layers are omitted for the sake of clarity, the depletion layers associated with said gate electrodes being shown and the three FIGS. 6*a*, 6*b* and 6*c* being in exact registration in the vertical sense. Similarly in the waveform diagrams of FIG. 7, each individual waveform is in exact time registration with every other waveform present.

Figure 7:
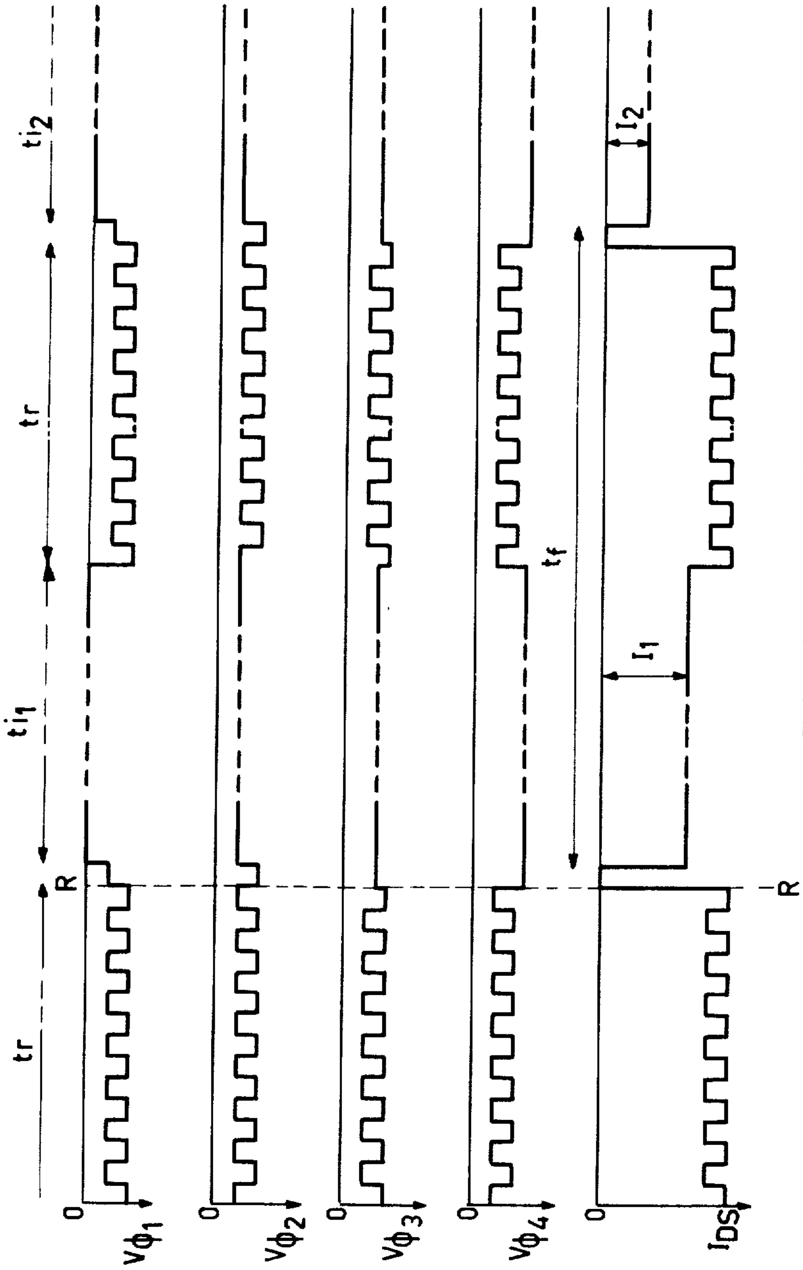
FIG. 7 shows various waveforms associated with the operation of the device shown in FIG. 6.

At the end of each frame period and thus prior to the commencement of the frame period $t_f$ indicated in FIG. 7 input information relevant to the following period $_f$ is fed into the device by means of an input electrical signal being converted into a charge pattern which is transferred by CTD action to depletion regions associated with the gates $G_2$.

During this "read-in" time $t_r$ the lines $\phi_1$ and $\phi_3$ are connected together and the lines $\phi_2$ and $\phi_4$ are connected together and after clocking, input information in the form of the charge pattern is stored by alternate CTD bits, namely in the depletion regions in the semiconductor layer 2 associated with the gate electrodes $G_{2B}$. FIG. 6*a* shows the condition after said read-in with different amounts of charge being present in the depletion regions below the gate $G_{2B}$ of different alternate CTD bits. Thus in FIG. 6*a* more charge (indicated ++++) is present in the depletion region under the gate $G_{2B}$ of the first complete bit shown towards the left-hand side of FIG. 6*a* than is present in the depletion region under the gate $G_{2B}$ of the succeeding alternate bit (indicated ++) which in turn is greater than is present in the depletion region under the gate $G_{2B}$ of the following alternate bit (indicated +) at the far right-hand side of FIG. 6*a*. For the sake of the explanation to follow hereinafter it is mentioned that there is no charge present in the deplection region under the gate $G_{2B}$ of the alternate bit preceding the first complete one shown in FIG. 6*a*, said preceding alternate bit and its following bit $G_3$, $G_4$ being associated with the first $n^+$-drain region shown in this Figure.

At the end of the frame interval and thus following the read-in time $t_r$ the lines $\phi_1$ and $\phi_3$ are disconnected from each other as also are the lines $\phi_2$ and $\phi_4$ at the time indicated by R in FIG. 7. The magnitude of the potential applied to the line $\phi_4$ is now increased and the potential applied to the line $\phi_3$ is also increased by a corresponding amount but these increased potentials are not suufficient to permit any transfer of stored charge from the depletion regions associated with the electrodes $G_{2B}$. Said increase of potential applied to the line $\phi_4$ causes the depletion regions associated with the electrodes $G_{4B}$ now connected to the line $\phi_4$ to punch-through to the substrate/epitaxial layer p-n junction. The amount by which the magnitude of the potential applied to the line $\phi_4$ is increased is chosen such that it is at least as high as the punch-through voltage of the MOS capacitor having an electrode $G_{4B}$ with the highest punch-through voltage. In this manner punch-through occurs for each one of the depletion regions associated with a gate electrode $G_{4B}$ and epitaxial layer variations are compensated. Thus in the present example assume that the epitaxial layer variation is such that it increases in thickness from the area below the first gate $G_{4B}$ shown in the left-hand side of the Figure to the third gate $G_{4B}$ shown towards the right-hand side of the Figure. The potential applied to the line $\phi_4$ is chosen such that punch-through occurs below each one of the electrodes $G_{4B}$ but due to the epitaxial layer thickness variation, and hence the punch-through voltages associated with the electrodes $G_{4B}$, the amount of charge introduced into the respective deplection regions in the form of holes injected from the p-type substrate varies. Thus in FIG. 6*b* the amount of charge (indicated ++++) thus introduced below the first electrode $G_{4B}$ is greater than that (indicated ++) introduced below the second electrode $G_{4B}$ which in turn is greater than that (indicated +) introduced below the third electrode $G_{4B}$. It is noted that the electrodes $G_{4B}$ are of closed configuration and thus in the sections shown in FIGS. 6*a*, *b* and *c* the depletion regions associated therewith are shown extending below opposite sides of such electrodes and for the sake of clarity the total amount of charge present below the whole electrode is indicated below of the two portions thereof shown in the sections.

Following this punch-through resetting of the depletion regions associated with the gates $G_{4B}$ by said increase of the potential applied to the lines $\phi_4$ and $\phi_3$, these potentials are maintained at said levels and the potentials applied to the lines $\phi_1$ and $\phi_2$ are lowered so that the charge stored in the depletion regions associated with the gates $G_{2B}$ and representing stored input information is transferred to the depletion regions associated with the gates $G_{4B}$ in the respective following CTD bits. This corresponds in time to the commencement of the frame interval $t_f$ indicated in FIG. 7. The state of the depletion regions and the charge present at this time, immediately following the transfer of the stored charge representative of input information from the depletion regions associated with the gates $G_{2B}$ to those associated with the gates $G_{4B}$ is shown in FIG. 6*c*. Thus for the first gate $G_{4B}$ shown on the left-hand side of FIG. 6*c* the FET channel associated with the $n^+$-drain bounded by this gate remains blocked because the charge stored in the depletion region associated with the gate $G_{2B}$ of the preceding CTD bit was zero, corresponding to the dark state for the relevant element of the display for the said frame interval $t_f$. The depletion region associated with the next succeeding gate $G_{4B}$ shown has retracted due to the transfer of the amount of charge represented ++++ from the depletion region associated with the preceding gate $G_{2B}$ and thus the FET channel associated with the $n^+$-drain bounded by this gate has become unblocked and is of a width dependant upon the amount of transferred charge represented as ++++. It is noted that with the punch-through resetting the width of such an FET channel below a depletion region is determined by the amount of charge transferred and not the total amount of charge present in the depletion region which consists of the said transferred charge plus the charge introduced by the punch-through resetting. Thus variations in the epitaxial layer such as thickness and doping are suubstantially fully compensated and the FET channel current between the revelant $n^+$-drain region and the common source connection S is determined by the amount of transferred charge substantially independent of said variations in the epitaxial layer. The depletion region associated with the next succeeding gate $G_{4B}$ shown at the right-hand side of FIG. 6c has retracted due to the transfer of the amount of charge represented as ++ from the depletion region associated with the preceding gate $G_{2B}$ and thus the FET channel associated with the $n^+$-drain bounded by this gate has become unblocked and is of a width dependent upon the amount of transferred charge represented as ++. FIG. 6c indicates the intensity of the radiation emitted by the electroluminescent diodes in series with the three FET channels under consideration, the intensity for a particular element being determined by the amount of charge initially introduced into the depletion region below the gate $G_{2B}$ associated with said element. In FIG. 7 the source/drain current $I_{DS}$ for one particular FET element is indicated and for the frame interval $t_f$ under consideration is of a magnitude $I_1$. This interrogation part of the frame period which commences following the punch-through resetting of the depletion regions associated with the gates $G_{4B}$ and the transfer of charge thereto from the depletion regions associated with the gates $G_{2B}$ is indicated by $t_i$ in FIG. 7 and is followed by a resetting period $t._r$. The period of $t_r$ is, for example approximately 10 microseconds for a device having 100 CTD bits and the total frame period $t_f$ being 40 milliseconds. Thus the resetting period $t_r$ is very small compared with the interrogation period $t_i$ and because a constant D.C. bits is maintained between the common source connection S and the FET drains the FET channel current $I_{DS}$ during the resetting period $t_r$ will be as shown in FIG. 7. The resetting period commences with the re-connection of the lines $\phi_1$ and $\phi_3$ and the lines $\phi_2$ and $\phi_4$ and following this by two-phase CTD action the charge present in the depletion regions associated with the gates $G_{4B}$ is clocked out via an output stage at the end of the CTD line and an input charge pattern for the next frame period is introduced into the depletion regions associated with the gates $G_{2B}$. FIG. 7 indicates that the FET channel current $I_{DS}$ for the same FET element as previously under consideration in the frame period following $t_f$ has fallen to a value $I_2$ in the interrogation period $t_i$ of this frame period, this being due to the introduction of a small amount of charge into the depletion region associated with the respective gate electrode $G_{2B}$ during the resetting period $t_r$ at the end of the preceding frame period $t_f$.

FIG. 65a indicates, by way of example, the connection of the $n^+$-FET drains to electroluminescent diodes which are connected to a common drain line D. It will be appreciated that in a display embodying a CTD and FET structure in accordance with the invention current controlled display means other than p-n junction diodes may be connected in series with the FET channels. Thus in the embodiment now to be described with reference to FIG. 8 a deposited electroluminescent layer is provided in series with the FET channels, said electroluminescent layer having a high lateral resistance to provide for isolation between adjacent elemental portions thereof. The device shown in FIG. 8 is similar to construction to that shown in FIG. 6 in respect of the p-type semiconductor substrate 1, the n-type epitaxial layer 2, the silicon oxide insulating layer 3, the common source connection S to the layer 2, and the substrate connection SUB to the substrate 1. The CTD gate electrodes are indicated by the same references as used in FIG. 6, the gates $G_{1A}$ to $G_{4A}$ inclusive consisting of aluminum layer portions on the silicon oxide layer 3 and the gates $G_{1B}$ to $G_{4B}$ consist of doped polycrystalline silicon layer portions on the silicon oxide layer 3, the latter portions being covered with a grown layer of silicon oxide and insulated from the aluminum gates. The aluminium gates $G_{1A}$, $G_{2A}$, etc. overlap the polycrystalline silicon gates $G_{1B}$, $G_{2B}$ etc. by a very small amount. A further deposited oxide layer is present on the surface of the aluminum gates.

On the surface of the n-type semiconductor layer at the location of the $n^+$-FET drains there are ohmic contact layers of aluminum. An electroluminescent layer for example of zinc sulphide, indicated EL in FIG. 8 is present on the upper surface of the device and makes ohmic contact with the aluminum layer portions in contact with the $n^+$-FET drains. On the upper surface of the electroluminescent layer EL there are a plurality of ohmic electrodes each in registration with an underlying $n^+$-FET drain and all connected to a common drain line indicated D. Thus the portion of the deviice shown in FIG. 8, in which two complete CTD bits are shown with the $n^+$-FET drain in the right-hand side of the Figure being that of the FET element directly associated with said two CTD bits, corresponds to a similar portion of the device shown in FIG. 6. The operation of the device shown in FIG. 8 is carried out in a similar manner as described with reference to FIGS. 6 and 7. FIG. 8 shows the condition at that part of the frame interval during interrogation when the FET channels are unblocked, the charge present in the two depletion regions associated with the gates $G_{4B}$ shown in this Figure being shown as equal amounts of charge solely for the sake of clarity.

Figure 9:
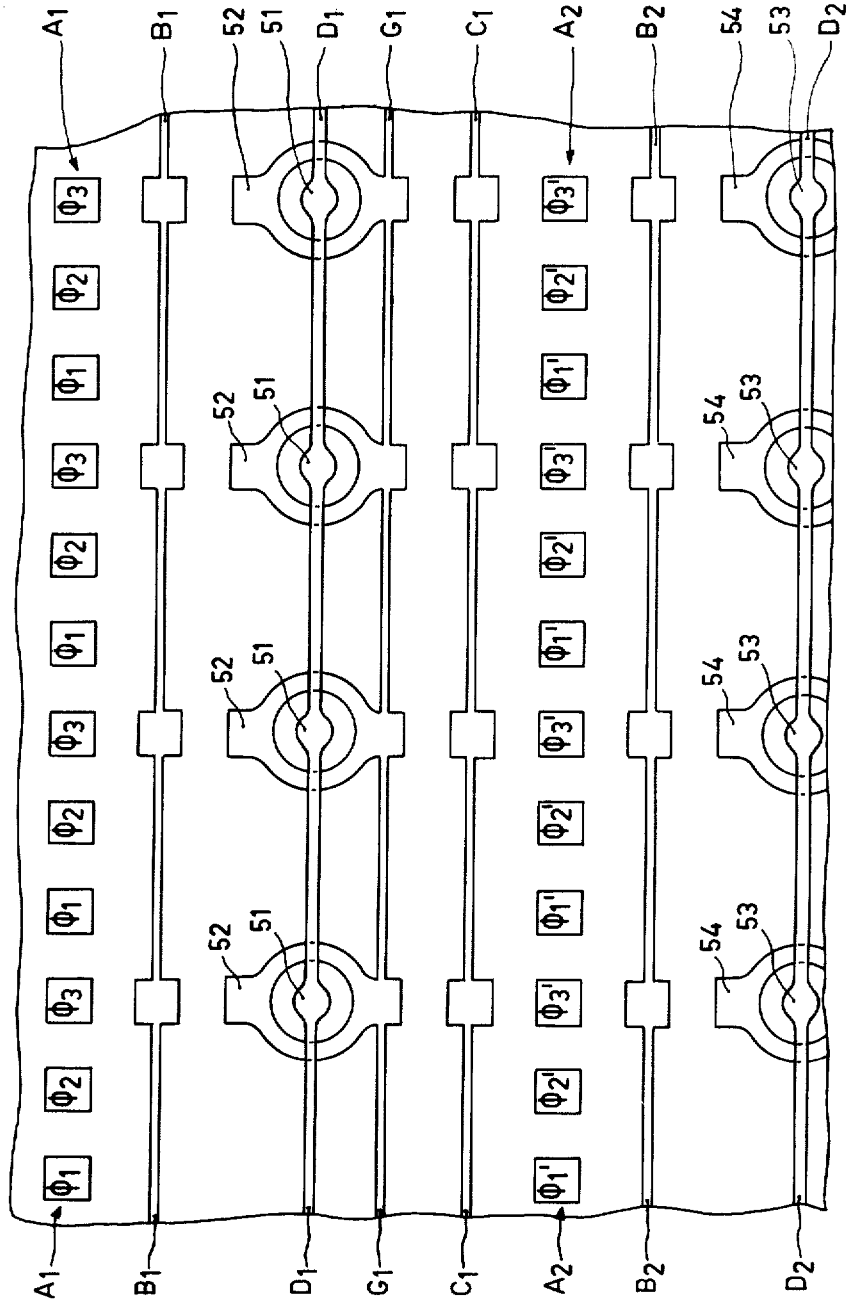
FIG. 9 is a diagrammatic plan view of the electrode structure of part of another device in accordance with the invention and in the form of a solid state display device comprising a plurality of three-phase charge storage and transfer arrangements.

FIG. 9 shows a plan view of the electrode configuration adjacent a part of the semiconductor layer surface of a device in accordance with the invention in the form of a television display device comprising an array of FET structures integrally combined with an array of charge tranfer and storage means. The electroluminescent means are present at the opposite side of the layer and may be in the form as shown in FIGS. 2 and 3. The array of FET structures is formed by a plurality of rows, two of which rows are shown in FIG. 9. In the upper row shown the FET drain electrodes are each indicated by reference numeral 51 and the FET gate electrodes on the surface insulating layer are each indicated by reference numberal 52. In the lower row shown the FET drain electrode are each indicated by reference numeral 53 and the FET gate electrodes on the surface insulating layer are each indicated by reference numeral 54. The drains in the upper row are interconnected via the common line contact $D_1$ and the drains in the lower row are interconnected via the common line contact $D_2$. The FET gates in the individual rows are interconnected and the gates 52 in the upper row are shown interconnected via the common line contact $G_1$. Further rows of insulated gate electrodes are situated above and below the FET annular gates in the row connected by the line $G_1$, the electrodes in the row immediately above the FET gates being in registration with the adjacent portions of the FET gates and interconnected via a common contact line $B_1$. Similarly the electrodes in the row immediately below the FET gates are in registration with the adjacent portions of the FET gates and interconnected via a common contact line $C_1$. Situated above the row of gate electrodes connected by the common contact line $B_1$ there is a further row of insulated gate electrodes $A_1$. These electrodes $\phi_1$, $\phi_2$ and $\phi_3$ form a plurality of three-phase CTD bits, the electrodes $\phi_3$ being situated adjacent the electrodes in the next row of electrodes connected by the common contact line $B_1$. Below the electrodes in the row connected by the common line $C_1$ the pattern is repeated, starting with a line $A_2$ of three-phase CTD bits, the electrodes thereof being indicated by $\phi_1'$, $\phi_2'$ and $\phi_3'$.

The lines $A_1$, $A_2$ etc. are used for introduction storage, and removal of the input video signals. Thus on line $A_1$ the input video signals for this line are clocked along in the lateral direction of the row of electrodes $\phi_1$, $\phi_2$ and $\phi_3$ and the charge pattern indicative of the video input for one line is formed in the depletion regions below the gate $\phi_3$. A sufficiently high resetting potential is applied to the line $G_1$ to cause the depletion layers associated with the gates 52 to punch-through the semiconductor layer to the junction at the lower surface. The charge pattern below the electrodes $\phi_3$ in line $A_1$ is then transferred in the transverse direction to the depletion regions associated with the gates 52. This is effected by three-phase CTD action using $\phi_3$, the adjoining electrode in row $B_1$ and the respective gate electrode 52. A potential is now applied between the line $D_1$ and the common source of the FET's and a display in the associated line part of the underlying electroluminescent layer is obtained. After this form of readout, the stored charge below the gates 52 is removed by three-phase CTD action and transferred to the electrodes $\phi_3'$ in line $A_2$ via the adjacent electrodes in line $G_1$. This stored charge may be clocked out along the line $A_2$. However the line $A_2$ also serves for clocking in and storing the charge pattern for the gates of the FET's in the next row $D_2$. Similarly the line $A_1$, in addition to serving for introducing and storing the charge pattern to be applied to the gates of the FET's in the row $D_1$ also serves for removal of charge previously stored below the FET gates of the next row above of FET's. It should be noted that FIG. 9 is purely diagrammatic, the spacing of the electrodes on the insulating layer in relation to the size of said electrodes being much smaller in practice.

Figure 11:
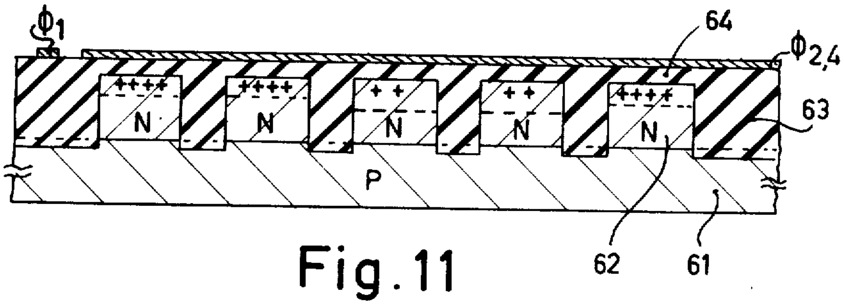
FIG. 11 is a cross-sectional view taken on the line XI—XI of FIG. 10.

Referring now to FIGS. 10 to 12 there will now be described a further embodiment of the invention in the form of a 1024 bit dynamic random access memory. The device comprises a high resistivity p-type silicon substrate 61 having thereon an n-type silicon eepitaxial 62. The epitaxial layer is divided into 32 islands by a sunken oxide pattern 63 formed by the local oxidation of the silicon epitaxial layer 62, the sunken oxide pattern 63 extending into the underlying substrate 61. On the surface of the silixon epitaxial layer islands there is a further silicon oxide layer having relatively thick portions 64 and relatively thin portions 65. FIG. 10 shows five of the 32 islands which are of rectangular surface configuration and arranged as parallel columns, the five islands shown in FIG. 10 constituting columns number 1, 2, 30, 31 and 32. Extending on the surface of the insulating layer portions 63, 64 and 65 there are a plurality of two-phase charge transfer device (CTD) electrodes. These comprise 32 electrode strips connected to a common line $\phi_1$ which alternate with 32 further electrode strips which are individually electrically accessible and indicated $\phi_{2,1}$ to $\phi_{2,32}$, these electrodes $\phi_1$ and $\phi_2$ being arranged in rows extending transverse to the columns. Each pair of adjoining succeeding electrodes $\phi_1$ and $\phi_{2,x}$ where $x$ is from 1 to 32 form one bit of a two-phase CTD structure, each electrode $\phi_1$ extending partly on a thicker silicon oxide portion 64 and on a thinner silicon oxide portion 65 and each electrode $\phi_{2,x}$ extending partly on a thicker silicon oxide portion 64 and on a thinner silicon oxide portion 65. For the sake of clarity, of the 32 electrodes $\phi_{2,x}$ only, $\phi_{2,1}$, $\phi_{2,2}$, $\phi_{2,4}$, $\phi_{2,30}$, $\phi_{2,31}$, $\phi_{2,32}$ are shown in FIG. 10. The CTD electrodes further include 32 input gate electrodes $G_x$(CTD), where $x$ is from 1 to 32, individually elecrically accessible and associated with the individual islands in the epitaxial layer constituting the columns, and an output gate electrode $G_{O/P}$(CTD) arranged in a row following the electrode $\phi_{2,32}$. The input gate electrodes $G_x$(CTD) are associated with and overlap $p^+$-diffused surface regions situated near the ends of the epitaxial layer columns, said $p^+$-regions providing sources of holes for injection into the depletion regions in the n-type epitaxial layer associated with the CTD input electrodes. These $p^+$-regions are connected to a common CTD source line indicated $S_c$(CTD). The common output gate electrode $G_{O/P}$(CTD) is associated with and overlaps $p^+$-diffused surface regions situated near the opposite ends of the epitaxial layer columns, said $p^+$-regions providing drains for removal of holes from the depletion region associated with the output gate $G_{O/P}$(CTD). These $p^+$-regions are connected to a common CTD drain line indicated $D_c$(CTD). At the first referred to end of each column in the epitaxial layer there is an $n^+$-diffused surface region forming a source region of a deep depletion FET structure, the drain region of such a structure being constituted by an $n^+$-diffused surface region at the opposite end of the column. The FET source regions are contacted by metal layer portions which are connected to a common FET source line indicated $S_c$(FET). The FET drain regions are contacted by metal layer portions which are individually electrically accessible via separate FET drain lines indicated $D_x$(FET) where $x$ is between 1 and 32. The gate electrode of an FET structure present in one column can be that part of any one of the thirty-two electrodes $\phi_{2,x}$ which lies on the thinner oxide layer portion 65. Thus in effect the deep depletion FET structure in a column comprises 32 gate electrodes, any one of which is operable at any one time to modulate the FET channel current between the source and drain regions in the relevant column.

The operation of the memory device will now be described with particular reference to FIGS. 12*a*, *b* and *c* and also with particular reference to the memory bits in the 32 column. A certain bit of the memory is defined in one of the 32 columns in the epitaxial layer by the electrode pair $\phi_1$ and $\phi_{2,x}$. Thus in FIG. 10 in the 31 column, two of the 32 bits associated with this column are indicated by rectangles in broken outline. These are the bits formed by electrodes $\phi_1$, $\phi_{2,1}$ and by electrodes $\phi_1$, $\phi_{2,30}$. Information is stored in the memory bits in the form of charge present in the depletion regions in the n-type epitaxial layer associated with that part of the electrodes $\phi_{2,x}$ situated on the thinner silicon oxide layer 65. This charge information is fed into the bits in the various columns by two-phase conventional CTD action using the input gates $G_x$(CTD) to control the amount of charge fed into the bits in the respective columns and using the electrodes $\phi_1$ and $\phi_{2,x}$ for the transfer along the columns by applying clock voltages to the lines $\phi_1$ and $\phi_{2,x}$, all the electrodes $\phi_{2,x}$ being connected in common for this part of the operation. Thus FIG. 12*a* shows the conditions in the 31 column after writing the memory with charge information in the said manner. The information in each bit corresponds to a zero or a 1 and this is represented as a small quantity of charge (indicated ++) or a large quantity of charge (indicated ++++). With the same potential applied to all of the electrodes $\phi_{2,x}$, the extent of the depletion regions associated with individual electrodes $\phi_{2,x}$ is determined by the amount of stored charge. Thus in the thirty-first column as shown in FIG. 12*a*, the information stored in the bit defined at $\phi_1$, $\phi_{2,1}$ is a 1 as also is the information stored in the bit defined at $\phi_1$, $\phi_{2,31}$, and the information stored in the bit defined at $\phi_1$, $\phi_{2,2}$ is a zero as also is the information stored in the bits defined at $\phi_1$, $\phi_{2,30}$ and $\phi_1$, $\phi_{2,32}$. In this storage condition the FET channels which extend the whole lengths of the columns are unblocked.

The read-out of the stored information is carried out as follows. Suppose, for example, it is desired to read the bit in the 31 column defined by the electrodes $\phi_1$, $\phi_{2,1}$, this bit being shown in dotted outline in FIG. 10 and the read-out condition of this bit being shown in FIG. 12*b*. To effect read-out of this bit the potential applied to the line $\phi_{2,1}$ is increased by a predetermined amount but keeping the remaining electrodes $\phi_{2,x}$ at their initial constant potential. While maintaining said increased potential a potential is applied between the respective FET drain line $D_{31}$(FET) and the common FET source line $S_c$ (FET) and the magnitude of the FET channel current either as a small current near zero or a substantial current (measured as an output voltage $V_0$ across a resistor as shown in FIG. 12*b* indicates the charge state and hence the the information in this bit. Thus in the present case, see FIG. 12*b*, due to the larger amount of stored charge the initial depth of the depletion region below $\phi_{2,1}$ is relatively small and therefore when increasing the potential applied to $\phi_{2,1}$ by the said predetermined amount the further extension of the depletion layer is insufficient to block the FET channel and a substantial channel current flows indicating the presence of a 1 in this bit. Consider now the reading of the bit in the same, 31 column defined by $\phi_1$, $\phi_{2,30}$ and indicated in broken outline in FIG. 10 and the reading conditions being shown in FIG. 12*c*. This bit is read by increasing te potential applied to the line $\phi_{2,30}$ by the same said predetermined amount but keeping the remaining electrodes $\phi_{2,x}$ at their initial constant potential. While maintaining said increased potential, a potential is applied between the FET drain line $D_{31}$ (FET) and the common FET source line $S_c$(FET) and the magnitude of the FET channel current either as a small current near zero or a substantial current indicates the charge state and hence the information in this bit. Thus in the present case, see FIG. 12(*c*), due to the smaller amount of stored charge the initial depth of the depletion region below $\phi_{2,30}$ is relatively large and therefore when increasing the potential applied to $\phi_{2,30}$ by the said predetermined amount the further extension of the depletion layer almost but not entirely blocks the FET channel and a very small current, near zero, flows indicating the presence of a zero in this bit. The said predetermined amount by which the potential applied to a line $\phi_{2,x}$ is increased for read-out is chosen so that none of the depletion regions can punch-through to the substrate/epitaxial layer p-n junction. In this manner the read-out is nondestructive and any one bit can be read more than once. It is also noted that read-out of more than one bit can be carried out at a certain time. Thus two or more bits in the same row but in different columns can be simultaneously read-out by applying the said increased potential to the relevant electrode $\phi_{2,x}$ and simultaneously applying read-out potentials to the FET drains of te relevant columns and interpreting the information state of the bits by the magnitudes of the FET channel currents.

To write further information in the memory a conventional two-phase CTD action is employed using clock voltages applied to the lines $\phi_1$ and $\phi_{2,x}$ with the latter all being connected in common for the writing. During this operation charge is removed at the end of the CTD lines in the columns via the $p^+$-regions connected to the common CTD drain line indicated $D_c$(CTD).

It will be appreciated that to avoid punchthrough of a depletion region to the substrate/epitaxial layer p-n junction when increasing the potential applied to a line $\phi_{2,x}$ by the said predetermined amount it is necessary also to predetermine the potential initially applied to the lines $\phi_{2,x}$ and the amount of charge corresponding to the state 1 introduced into a depletion region below an electrode $\phi_{2,x}$. This has to be effected in such manner as to also allow for epitaxial layer variations which may give rise to differences in punch-through voltage for different electrodes $\phi_{2,x}$. Similarly the difference in the two amounts of charge introduced into and stored in the depletion regions and corresponding to the two states, that is 1 or "zero" has to be appropriately chosen such as to render a significant difference in the FET channel currents on read-out.

Referring now to FIG. 13, there is shown part of a further embodiment of a device in accordance with the invention which differs from the previous embodiments in respect of the form of the charge storage and transfer means but nevertheless shows the same underlying principles of surface charge storage and transfer as in the previous embodiments. This device comprises a so-called "MOS bucket brigade" array of charge transfer and storage means which are integrally combined with a plurality of deep depletion FET structures to form a device substantially similar in operation and possessing the same advantages as the device described with reference to FIG. 1. The semiconductor body comprises a high resistivity p-type substrate 71 having thereon a high resistivity n-type epitaxial layer 72. On the upper surface of the epitaxial layer 72 there is a silicon oxide layer 73 of substantially uniform thickness. This epitaxial layer at the upper surface comprises a $n^+$- diffused skin 74. In the epitaxial layer there are a plurality of spaced $p^+$-regions. Of these regions, the $p^+$-region 75 is connected to an input conductor 81 which is capacitively connected to an input terminal and connected through a resistor to an input voltage source $V_i$. Further $p^+$-regions 76 and 77 are arranged in an alternating series, the regions 77 being of closed configuration. These regions 76 and 77 together with a series of metal electrodes 82 and 83 situated on the surface of the insulating layer 73 form a so-called bucket brigade array of charge transfer and storage means, all the electrodes 82 being connected to a common line $\phi_1$ and all the electrodes 83 being connected to a common line $\phi_2$. At the portions of surface of the n-type epitaxial layer bounded by the $p^+$-regions 77 there are ohmic connections 85, 86, etc. respectively connected to lines $D_1$, $D_2$ etc. These ohmic connections constitute drain electrodes of a plurality of deep depletion field effect transistor structures, the sources of said transistors being constituted by a common connection S to the n-type layer 72. The FET channel currents between the common source connection S and the drains $D_1$, $D_2$ etc. are modulated by the depletion region envelopes associated with the p-n junctions between the $p^+$-regions 77 and the n-type epitaxial layer 72. The extent of such a depletion region envelope is determined by the potential of the respective $p^+$-region 76 which in turn is dependant upon the charge stored by the associated charge storage means formed by the electrode 83 the insulating layer 73 and the underlying $p^+$-region 77.

The bucket brigade array formed by the $p^+$-regions 76, 77 and the electrodes 82, 83 is constituted by a series of MOS transistors which serve to transfer charge sequentially between adjacent capacitive charge storage means constituted by the electrodes 82 or 83, the silicon oxide layer 73 and the underlying $p^+$-region 76 or 77 respectively. For a full description of the operation of such a form of "bucket brigade" charge storage and transfer device reference is invited to U.K. Pat. No. 1,273,181. In operation for the charge transfer the lines $\phi_1$ and $\phi_2$ are alternately connected to a source of switching voltage. Thus, for example, when connecting the line $\phi_1$ to such a source of switching voltage the charge transfer between two adjoining storage means is as follows. On applying the switching potential to an electrode 83 which constitute a gate electrode of an MOS transistor of which the source is the adjacent region 76 and the drain is the underlying region 77, most of the potential is dropped across the drain depletion region associated with the p-n junction between the drain 77 and the epitaxial layer 72 and thus the $p^+$-drain 77 becomes negatively charged. Also the MOS transistor is switched on, provided the switching potential exceeds the threshold voltage $V_T$ and therefore holes flow out of the $p^+$-source region 76, it being noted that the preceding MOS transistor is off because $\phi_2$ is grounded, until the potential between the $p^+$-region 76 and the gate electrode 83 drops to $V_T$ and the MOS transistor thus is turned off. If no charge is initially present in the preceding storage means constituted by an electrode 82, the oxide layer 73 and the underlying $p^+$-region 76, then when the MOS transistor is turned on the $p^+$-source 76 will already be at a potential equal to $V_T$ and no charge will be transferred via the channel of this transistor to the $p^+$-drain 77. The switching voltages are preferably chosen to be of such a magnitude that is such a $p^+$-region 77 receives no charge from the preceding storage stage than the depletion region envelope associated with the p-n junction between the $p^+$-region 77 and the n-type epitaxial layer pinches-off the channel of the associated deep depletion FET structure.

This device of which only a part is shown in FIG. 13 comprises a large plurality of deep depletion FET structures together with an output $p^+$-region and electrode connection. Operation in respect of non-destructively reading the charge condition at the various stages in the array by means of applying a potential between the FET drains and the common source, is substantially similar to that in the previously described embodiments and the device may be constructed in a similar manner, for example as a display device, an imaging device or as a solid state memory device.

It will be appreciated that many modifications can be made without departing from the scope of the invention. Means other than those described may be employed to obtain two phase CTD bits, for example, different threshold voltages for two gates in one pair may be achieved by local variations in doping of the underlying semiconductor layer. Also when using a single metal layer electrode for the two gates in one pair, means other than local variations in insulating layer thickness may be used, for example, for the higher threshold voltage part a polycrystalline silicon layer may be interposed between the semiconductor layer surface and the insulating layer over which the single metal gate extends and for the lower threshold voltage part the single metal gate extends on the insulating layer which at this portion is directly on the semiconductor layer surface.

Although in all the embodiments described the FET channels which are modulated by the depletion region envelopes associated with the charge storage means lie in the surface epitaxial layer with which the charge storage means are associated, within the scope of this invention is a structure in which the FET channels which are thus modulated are present in an underlying layer of opposite conductivity type. For example the said surface layer comprising the charge storage means may be of one conductivity type and situated on a layer of the opposite conductivity type which in turn is situated on a substrate of the one conductivity type. In this device ohmic source and drain connections to the layer of the opposite conductivity type are present, the p-n junction between the substrate and the layer of the opposite conductivity type and the p-n junction between the p-n junction between said two layers are reverse biased to just block the FET channels in the layer of the opposite conductivity type. The depletion region envelopes in the layer of the one conductivity type and associated with the charge storage means are employed to locally reduce the potential across the underlying p-n junction between the two layers thus causing the depletion region associated therewith to be locally pinched-in and open up the FET respective channels. This structure can be employed advantageously in a memory device because it permits the formation of a structure in which FET source and drain lines are situated extending parallel with the CTD lines and each memory element can be read without a large series resistance being present between the FET source and drain.

The information representing charge is stored and transferred in the form of packets of mobile charge carriers. Preferably these charge carriers are minority charge carriers, i.e., carriers of the type which in thermal equilibrium constitute the minority in the semiconductor layer comprising the source, channel and drain regions of the FET structures which serve for read-out of the information.

What is claimed is:

1. A semiconductor device comprising a semiconductor body, a plurality of spaced conductive layers extending over and insulated from a surface layer of the semiconductor body, said conductive layers forming with underlying regions of the surface layer and the intervening insulating material a plurality of succeeding capacitance charge storage means whereby charge can be stored in said body at a plurality of sites and on application of appropriate potentials to the conductive layers charge can be transferred sequentially in a preferred direction via said storage means, a plurality of field effect transistor structures each having a channel region constituted by a region of the semiconductor body underlying a different charge storage site of the charge storage means, the size of each channel being affected by the amount of charge stored in the overlying site, and means including source and drain connections to the semiconductor body for obtaining an instantaneous output indicative of the individual charge stored in each of the storage sites overlying the channel of one of said plural field effect transistor structures by applying an appropriate potential between the source and drain connections which would tend to cause current to flow through the said channel underlying the storage site to be interrogated.

2. A semiconductor device as claimed in claim 1, wherein the channel regions of the field effect transistor structures are located in bulk portions of said semiconductor surface layer.

3. A semiconductor device as claimed in claim 2, wherein the said semiconductor surface layer comprises an epitaxial layer of one type conductivity provided on a substrate of opposite conductivity type.

4. A semiconductor device as claimed in claim 2, wherein the surface layer is of one conductivity type and the said underlying channel regions of the surface layer are also of the one conductivity type, the charge being stored in the form of minority carriers in depletion regions in the surface layer below the conductive layers, the depletion regions associated with a plurality of the charge storage means serving to determine the conductivity of underlying channel regions of field effect transistor structures in accordance with the amount of charge stored in said storage means.

5. A semiconductor device as claimed in claim 2, wherein the surface layer is mainly of one conductivity type and the said underlying regions of the surface layer are more highly doped regions of the opposite conductivity type, the depletion regions associated with the p-n junctions between the regions of the opposite conductivity type and the layer material of the one conductivity type serving to determine the conductivity of said underlying channel regions.

6. A semiconductor device as claimed in claim 4, wherein the said conductive layers are present in plural groups with corresponding members in individual groups electrically connected in common and the field effect transistor structures comprise a plurality of first electrode connections to the surface layer corresponding to one of the source and drain connections, each of said first electrode connections being associated with an individual group of the conductive layers, the field effect transistor structures further comprising at least one second electrode connection to the surface layer corresponding to the other of the source and drain connections.

7. A semiconductor device as claimed in claim 6, wherein in each group of conductive layers which has a first electrode connection associated therewith one such layer is of closed configuration and the first electrode connection is provided on the surface layer within and surrounded by the electrode layer of closed configuration.

8. A semiconductor device as claimed in claim 6, wherein there is present in the surface layer a field effect transistor structure for each charge storage and transfer bit formed by a said group of conductive layers.

9. A semiconductor device as claimed in claim 6, wherein there is present in the surface layer a field effect transistor structure for each alternate charge storage and transfer bit formed by a said group of conductive layers.

10. A semiconductor device as claimed in claim 6, wherein in each group there are a pair of two interconnected electrode layer portions and the charge storage and transfer means are constructed for two-phase operation.

11. A semiconductor device as claimed in claim 2, wherein individual current controlled display means are present in series with each of the channel regions of the field effect transistor structures.

12. A semiconductor device as claimed in claim 11, wherein the device constitutes a display device in which electrical input signals are converted into a visible display.

13. A semiconductor device as claimed in claim 2, wherein the device constitutes a solid state memory device in which information in the form of a charge pattern is stored by a plurality of the said storage means and can be randomly non-destructively read-out by temporarily increasing the potential applied to the conductive layer forming part of a selected storage means in which charge information is present and which is desired to be read, while simultaneously applying an interrogation potential between the source and drain connections associated with the channel region situated below the selected storage means.

14. A semiconductor device as claimed in claim 13, wherein the semiconductor surface layer comprises a plurality of columns in which a plurality of charge storage and transfer bits are present, source and drain connections being present to the surface layer at opposite ends of each of the columns, the charge storage and transfer conductive layers extending as rows transverse to the columns, the conductive layer in any one row being common to the same numbered charge transfer and storage bits in the columns.

15. A semiconductor device as claimed in claim 14, wherein the charge storage and transfer bits are constructed for two-phase operation with each having first and second conductive layers, the charge information being stored in depletion regions associated with the second conductive layers in each bit, the rows of the first conductive layers of all the bits being connected in common and the rows of the second conductive layers of the bits being individually electrically accessible for the read-out.

16. A device as claimed in claim 1, wherein the storage sites are located in the same surface layer separated by a rectifying barrier from a substrate, and means for biasing the conductive layers and the substrate such that in the absence of signal charge in the storage sites the underlying channel regions are effectively blocked, the introduction of signal charge into a storage site causing unblocking of the underlying channel region.

* * * * *

UNITED STATES PATENT AND TRADEMARK OFFICE
CERTIFICATE OF CORRECTION

PATENT NO. : 3918070
DATED : November 4, 1975
INVENTOR(S) : JOHN MARTIN SHANNON

It is certified that error appears in the above-identified patent and that said Letters Patent are hereby corrected as shown below:

Column 2, line 46, change "vew" to -- view --.

Column 3, line 43, after "layer" insert -- 2 --.

Column 4, line 9, change "appliced" to -- applied --.

line 57, change "ceertain" to -- certain --.

Column 5, line 46, change "tining" to -- taining --.

line 55, change "aand" to -- and --.

Column 9, line 48, change "$G_{1A}$" to -- $G_{2A}$ --.

Column 11, line 1, after " . " insert -- Thus for each FET element there are two CTD bits. --.

line 26, change "$_f$" to -- $t_f$ --.

line 30, change "$G_2$" to -- $G_{2B}$ --.

line 50, change "deplection" to -- depletion --.

UNITED STATES PATENT AND TRADEMARK OFFICE

CERTIFICATE OF CORRECTION

PATENT NO. : 3918070

DATED : November 4, 1975

INVENTOR(S) : JOHN MARTIN SHANNON

It is certified that error appears in the above-identified patent and that said Letters Patent are hereby corrected as shown below:

Column 11, line 62, change "suufficient" to -- sufficient --.

Column 12, line 17, change "deplection" to -- depletion --.

Column 13, line 1, change "suubstantially" to -- substantially-- line 47, change "t" to -- $t_{i_2}$ --.

line 48, change "small" to -- smaller --.

line 52, change "65a" to -- 6a --.

line 65, change "to" (first occurrence) to -- in --.

Column 15, line 50, change "eepitaxial" to -- epitaxial --.

Signed and Sealed this

*fourth* Day of *May 1976*

[SEAL]

*Attest:*

RUTH C. MASON
*Attesting Officer*

C. MARSHALL DANN
*Commissioner of Patents and Trademarks*